April 27, 1943.   H. SOLAKIAN   2,317,491
RECLAMING OF RUBBER
Filed April 1, 1941
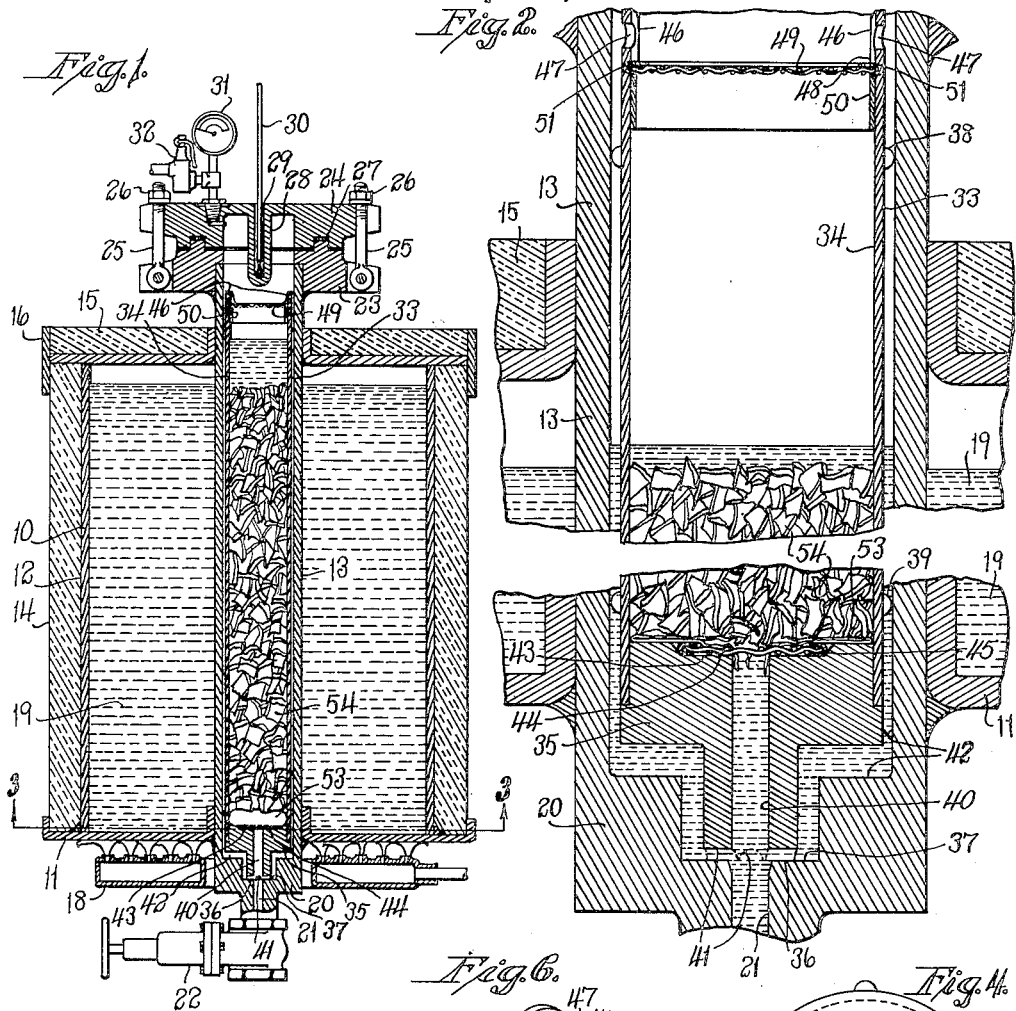

Patented Apr. 27, 1943

2,317,491

UNITED STATES PATENT OFFICE 2,317,491

RECLAIMING OF RUBBER

Haig Solakian, New Haven, Conn.

Application April 1, 1941, Serial No. 386,255

5 Claims. (Cl. 18—2)

This invention relates to improvements in the reclaiming of rubber or components of rubber from waste rubber products.

One object of this invention is to provide an improved process of reclaiming rubber in which the pieces of rubber to be reclaimed are subjected to a substantially uniform temperature throughout the reclaiming or devulcanizing action in order to bring about a substantially-uniform degree of devulcanization throughout the pieces of rubber.

Another object of this invention is to provide an improved process of devulcanizing rubber without degrading or substantially lowering the quality of the devulcanized rubber.

Another object of this invention is to provide an improved process of devulcanizing rubber immersed in water, so that at the end of the process the water which had been absorbed within the rubber being devulcanized, is entirely or substantially entirely removed in the form of steam, from the rubber.

Another object of this invention is to provide improved apparatus for carrying out the foregoing processes.

With the above and other objects in view, as will appear to those skilled in the art from the present disclosure, this invention includes all features of the said disclosure which are novel over the prior art.

In the accompanying drawing forming part of the present disclosure, in which one form of apparatus for carrying out the invention is shown for illustrative purposes:

Fig. 1 is a vertical central sectional view illustrating one embodiment of apparatus made in accordance with the invention;

Fig. 2 is an enlarged view similar to Fig. 1 of the inner container or cartridge together with fragmental surrounding portions of the apparatus, and with the major intermediate portion of the cartridge and adjacent parts broken away;

Fig. 3 is a horizontal sectional view on line 3—3 of Fig. 1;

Fig. 4 is a bottom plan view of the inner container or cartridge shown in Fig. 2;

Fig. 5 is a top plan view of the inner container or cartridge shown in Fig. 2; and Fig. 6 is a perspective view of a fragment of the upper end of the inner container showing one of the locking-ears thereof.

In the description and claims, the various parts and steps are identified by specific names for convenience, but they are intended to be as generic in their applications as the prior art will permit.

Referring to the drawing showing the particular form of the invention chosen for illustration, a heating-bath container 10 supported in any suitable way (not shown) has a bottom wall 11 and a cylindrical outer wall 12. A cylindrical pressure container 13 is secured to the bottom wall 11 liquid tight in any suitable way. Insulation 14 may, if desired, be placed around the wall 12 to minimize the loss of heat from the wall 12, and insulation 15 may be provided to cover the top of the container 10 to further minimize the loss of heat. Preferably, the insulation 15 with its carrying frame 16 will be formed in two semicircular parts divided along the line 17 (Fig. 3) so as to be readily removed from the container 10 by moving the two semicircular parts of the insulation 15 in diametrically-opposite directions away from the pressure container 13.

A gas burner 18 serves as a source of heat for heating a suitable heating material or medium 19 in the heating-bath container 10. Any suitable heating material may be employed so long as it is capable of having its temperature raised at least as high as the maximum devulcanizing temperature that is to be employed. Thus, for example, salts or oil or a metal can be used, so long as the material to be employed has a melting point below the maximum devulcanizing temperature to be employed, and a boiling point (or flash point in the case of inflammable material) above the maximum devulcanizing temperature to be employed. Of course, by having the container 10 under higher than atmospheric pressure, other heating materials could be employed. I have found that a satisfactory heating material can be formed by a combination of nitrates and nitrites of sodium and potassium salts to produce a suitable low melting point.

The pressure container 13 is made of suitable strength to withstand the pressure necessary to be employed in the devulcanizing process, and has a head 20 at its lower end provided with a passage 21 in communication with a gate-valve 22 which can be closed to maintain suitable pressure in the pressure container 13, or can be opened to permit the passage of water and steam out of the pressure-container 13 at the conclusion of the devulcanizing process.

Secured to the upper end of the pressure container 13 by welding or otherwise, is a lower pressure-flange 23 which, with a complemental upper pressure-flange 24 forms a pair of pressure-flanges of well-known form adapted to be firmly locked together by means of a plurality of bolts 25 which are pivoted to the flange 23 and carry nuts 26 on their upper ends. An annular gasket or packing 27 serves to make the connection between the two pressure-flanges gastight.

A thermometer well 28 depends from the center of the pressure-flange 24 and has an opening 29 into which a thermometer 30 may be readily inserted, and removed at will. Instead of employing a thermometer 30, or in addition to employing such a thermometer, a pressure gauge 31 and a safety-valve or safety blowoff 32 may be connected to the upper pressure-flange 24. As will hereinafter appear, the devulcanizing process is preferably carried out by pressure which is automatically developed by the temperature to which the water in the pressure container 13 is heated, any given pressure existing in the apparatus corresponding to a definite and well-known temperature of the water in accordance with the tables of the properties of saturated steam as published in engineers' handbooks and elsewhere. Therefore, by marking the scale of the pressure-gauge 31 to read temperature instead of pounds, such a pressure-gauge provides ready means for determining the temperature present at any given instant within the apparatus without any lag in such reading, which lag would, of course, always exist in the case of a thermometer such as 30. The safety-valve 32 provides protection against unduly high pressure being developed within the pressure container.

A cartridge or inner container 33 is insertable down into and removable up out of the pressure container 13 while the upper pressure-flange 24 is removed.

The cartridge or inner container 33 has a cylindrical shell 34 secured to a head 35 at its lower end, said head 35 having an end face 36 adapted to rest upon a seating-face 37 of the head 20 of the pressure container 13. An upper set of projections or studs 38 and a lower set of heads or projections 39 serve to space the inner container 33 substantially centrally within the pressure container 13.

A central passage 40 of the head 35 is in line with and connects the passage 21 of the head 20 of the pressure container 13 with the interior of the inner container 33, and transverse slots 41 in the end of the head 35 of the inner container 33 serve to interconnect the passages 21 and 40 with the space 42 between the inner container 33 and the pressure container 13.

A depression or recess 43 in the upper face of the head 35 serves to receive a lower screen-member 44 which includes an annular sheet-metal frame-member 45 on the screen element proper.

The upper end of the inner container 33 has a pair of upstanding ears 46 each provided with an aperture 47 and a locking-nose 48, the two ears 46 being diametrically opposite one another. An upper screen-member 49 includes a sheet-metal frame 50 on the screen-member proper. The frame-member 50 is provided with a pair of opposed recesses 51 to permit the screen-member 49 to be moved down axially of container 33 into position over the ears 46 into the position shown in Fig. 2, whereupon the screen-member 49 is rotated clockwise to bring edge portions 52 of the screen-frame 50 under the locking noses 48 of the ears 46. The apertures 47 in the ears 46 serve to be engaged by hooks or other suitable means to permit of lowering the inner container 33 into or lifting it out of the pressure container 13.

When it is desired to carry out devulcanization of waste rubber in accordance with the present invention, and assuming that the heating material 19 in the heating-bath container 10 has been raised to a suitable temperature by the gas burner 18, and assuming that the pressure-flange 24 has been removed from the position shown so as to provide ready access to the interior of the pressure container 13, and assuming that the inner container 33 is removed from the pressure container 13 and has its upper end open without the upper screen-cap or screen-member 49 thereon, a toy balloon or other thin rubber bag 53, after being filled with water and having its opening tied shut or otherwise closed, is dropped into position in the container 33, whereupon it spreads itself out in the manner shown in the bottom of the container 33 in Fig. 1, to thus seal the passage 40 against leakage of water therethrough. Thereupon pieces of waste rubber 54 are filled into the container 33 up to a suitable height, and water is added to more than cover the pieces of rubber in a manner somewhat as shown in Fig. 1. The upper screen-member 49 is then placed in position and rotated clockwise to lock it, whereupon the container 33 is lowered within the pressure container 13, and the upper pressure-flange 24 carrying a gasket 27 is then placed in position and properly bolted to cooperate with the valve 22 in closed position to render the pressure container 13 gastight. Inasmuch as the pressure container 13 is already at a relatively-high temperature, due to the reservoir of heating material 19, which is very hot, heat rapidly penetrates into the inner container 33 and quickly results in rupture or disintegration of the toy balloon seal 53, which upon breaking permits water from the inner container 33 to flow down through the lower screen-member 44 and through the passages 40 and 41 into the space 42 surrounding the inner container 33, so that the level of water, both inside and outside of the inner container, will come to the same level, as shown in Fig. 2. Owing to expansion of the water by the heat, the original level of the water in the inner container 33 will not be lowered very much, if at all, even though some of the water flows into the space 42.

After the waste rubber in the inner container 33 has been brought to and subjected to suitable devulcanizing temperature for a suitable length of time, and preferably after the heating gas has been wholly or partly shut off from the gas-burner 18, to bring about a partial lowering of the temperature in the pressure container 13, the valve 22 is opened a small amount, which results in a more or less gradual release of pressure from the pressure container 13. The space 42 surrounding the inner container 33 permits of maintaining a balance of pressure between the upper and lower ends of the container 33 while the valve 22 is open a suitable degree, with the consequence that release of the pressure upon opening of the valve 22 a moderate amount, there is no excessive downward thrust of pressure against the lower screen-member 44, since the release of pressure by the opening of the valve 22 permits the steam in the upper end of the container 33 to pass out through the upper screen-member 49 and down along the outside space 42 between the containers 13 and 33, to thus maintain substantially balanced or similar pressures on the upper surfaces of the water within the inner container 33 and the space 42, thus resulting in water from both these locations passing down and out through the valve 22 until the containers 13 and 33 are emptied of water. The upper screen-member 49 serves to prevent pieces of rubber being carried up out of the inner container 33 in event of the valve 22 being suddenly opened too wide with consequent possible foaming up of the water in the inner container 33.

After all of the water which is in liquid condition has passed out from the containers 13 and 33 through the valve 22, then the water which has penetrated into the interior of the pieces of waste rubber which have been devulcanized, proceeds to boil, due to the lowering of the pressure which occurs within the pressure container 13, and thus passes out through the rubber and together with the steam in the containers 13 and 33, proceeds to pass out through the valve 22, to thus lower the steam-pressure in the containers 13 and 33 lower and lower. Owing to the high temperature and pressure which still exists in the containers and in the rubber after all of the liquid water has passed out of the containers 13 and 33, there is ample temperature and pressure still left to result in the water within the waste rubber boiling or evaporating out through the rubber, resulting in the rapid complete drying of the rubber before the pressure in the container 13 falls to anywhere near as low as atmospheric pressure. It is desirable to let the pressure off gradually so the rubber will retain its original size and shape and not be puffed up or swelled by a too sudden development of steam within the rubber.

As soon as all of the pressure has been released through the valve 22, the upper pressure-flange 24 is released by means of the bolts 25 and lifted off, whereupon the inner container 33 is withdrawn from the pressure container 13. The upper screen-member 49 is then rotated counter-clockwise to unlock it and is then lifted upward past the ears 46. The devulcanized waste rubber is then dumped or otherwise removed from the container, and preferably the lower screen-member 44 is withdrawn by a hook or in any desired manner to permit of inspection and remove from it any remnants of the toy balloon that may have adhered to it. After inspecting the inside of the containers 13 and 33 to see that they are free of any pieces of rubber, the lower screen-member 44 is again replaced in its operative position. Another water-filled toy balloon or other sealing member is then dropped into position as was previously described, and the container 33 is again filled with waste rubber and water and the container 33 is again inserted into the pressure container 13 which is then closed, and the devulcanization process is repeated, all as has been previously described in detail. Instead of using a single cartridge or container 33, a number of containers 33 can be used and a different container charged with waste rubber and water can be immediately substituted in place of a container which is removed with a charge of devulcanized rubber, to thus provide a maximum utilization of the apparatus, the removed container 33 with devulcanized rubber being emptied and prepared with another charge during the time that devulcanization of another container 33 is being carried out.

My improved apparatus provides a satisfactory means for devulcanizing rubber in accordance with the disclosure of Patent No. 2,079,489 to Cole. I have discovered, however, that for waste rubber products such as inner tubes of automobile tires, best devulcanizing or reclaiming results cannot be obtained when this rubber is subjected to as high temperature as 250° C. I have found that in order to reclaim this rubber in a devulcanized condition which is considered by those skilled in the art to be the most satisfactory for reuse, the temperature must not rise for any appreciable time beyond 240° C. Depending upon the temperature at which the heating material 19 is at when a cartridge or inner container 33 is inserted in the pressure container 13 with rubber to be devulcanized, the waste rubber to be devulcanized and the water with it can be raised to near the upper desired vulcanizing temperature limit at various speeds.

Where the upper vulcanizing limit of 240° is desired to be employed as in the case of devulcanizing inner tube rubber stock, I have found that very satisfactory results as to quality of devulcanization and time of accomplishing this is accomplished when the initial temperature and rate of heating of the heating material 19 is so controlled that about the last six minutes of the treating operation is occupied in the temperature rising from 237° to 239° and then returning to 237° within a period of time of about six minutes, during which six minutes, the major portion of the devulcanization occurs. Where a lower temperature of devulcanization is employed such as a temperature at about 205° C., the time required for devulcanization is about 28 minutes. And where the devulcanization temperature is about 140° C., the time required for devulcanization is about 52 minutes.

It is important to carry out the devulcanization by a gradual raising of the temperature to maximum and gradual lowering therefrom, in order that the interior of the pieces of waste rubber will be devulcanized to substantially the same degree as the exterior of the pieces of rubber, in other words, in order that the rubber throughout its mass shall be devulcanized substantially uniformly. It is also important that the rubber to be devulcanized shall be kept covered with water which is in the liquid condition throughout the devulcanizing treatment. The presence of the layer of water in the space 42 between the containers 13 and 33 also protects such pieces of rubber as may rest against the inner wall of the inner container 33 from being heated unduly high by a high temperature that might exist in the wall of the pressure container 13 if water were not present there.

Having the pressure container 13 and the cartridge or inner container 33 in the form of cylinders which are relatively long compared to their diameters, permits of rapid heating of the contents of the inner container 33.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. The process of reclaiming rubber from waste rubber, comprising: submitting the waste rubber to treatment by immersion in water at devulcanizing temperature near but not over 240° C.

and at pressure automatically developed by the water at such temperature.

2. The process of reclaiming rubber from waste rubber, comprising: submitting the waste rubber to treatment by immersion in water at devulcanizing temperature gradually raised to, and gradually lowered from, a temperature near but not over 240° C. and at pressure automatically developed by the water at such temperature.

3. The process of reclaiming rubber from waste rubber, comprising: submitting the waste rubber to treatment by immersion in water at devulcanizing temperature of considerably more than 100° C. and at pressure at least as high as necessary to maintain water in liquid condition; removing substantially all the water which is in liquid condition while the temperature of the water and rubber is considerably above 100° C. and while the pressure on the rubber is considerably above atmospheric pressure; and then lowering the said pressure to cause the water within the rubber to be converted into steam and leave the rubber in a substantially-dry condition.

4. Apparatus for reclaiming rubber from waste rubber, comprising: a pressure container having an opening through which an inner container may be passed, and closeable by a pressure-cover, and adapted to hold water at a devulcanizing temperature of considerably more than 100° C. and under pressure at least as high as necessary to maintain the water in liquid condition; an inner container removably positioned in said pressure container and adapted to contain rubber to be reclaimed and water; opening means adjacent the lower ends of each of said containers for permitting removal of substantially all the water which is in liquid condition while the temperature of the water and rubber is considerably above 100° C. and while the pressure on the rubber is considerably above atmospheric pressure; said inner container being sufficiently smaller than the inside of said pressure container to provide a space between the walls of said inner and pressure containers; and said inner container having temporary sealing means to temporarily seal the opening means adjacent its lower end until said inner container has been inserted into said pressure container and said pressure-cover has been closed.

5. Apparatus for reclaiming rubber from waste rubber, comprising: a pressure container having an opening through which an inner container may be passed, and closeable by a pressure-cover, and adapted to hold water at a devulcanizing temperature of considerably more than 100° C. and under pressure at least as high as necessary to maintain the water in liquid condition; an inner container removably positioned in said pressure container and adapted to contain rubber to be reclaimed and water; opening means adjacent the lower ends of each of said containers for permitting removal of substantially all the water which is in liquid condition while the temperature of the water and rubber is considerably above 100° C. and while the pressure on the rubber is considerably above atmospheric pressure; said inner container being sufficiently smaller than the inside of said pressure container to provide a space between the walls of said inner and pressure containers; and said inner container having heat-sensitive temporary sealing means to temporarily seal the opening means adjacent its lower end until said inner container has been inserted into said pressure container and said pressure-cover has been closed.

HAIG SOLAKIAN.